Sept. 30, 1952 C. S. HAZARD 2,612,288
APPARATUS FOR SELECTIVE OPERATION OF REGISTERS
IN LIQUID DISPENSING MECHANISMS
Filed Nov. 14, 1945 4 Sheets-Sheet 1

INVENTOR
Charles S. Hazard
BY George H. Corey
ATTORNEY

Patented Sept. 30, 1952

2,612,288

UNITED STATES PATENT OFFICE

2,612,288

APPARATUS FOR SELECTIVE OPERATION OF REGISTERS IN LIQUID DISPENSING MECHANISMS

Charles S. Hazard, New York, N. Y., assignor to Neptune Meter Company, a corporation of New Jersey Application November 14, 1945, Serial No. 628,551

3 Claims. (Cl. 222—26)

This invention relates to dispensing apparatus and more particularly to apparatus for automatically registering and recording, for the purpose of billing, the amounts dispensed at a plurality of loading stations.

In order to reduce the number of attendants and to make unnecessary the attention of the attendant at the loading station in an installation having plurality of loading stations and to bring the dispensing operation under control at a central point, for example, in the office, an automatic dispensing system has been proposed as disclosed in the applications of Charles S. Hazard and Johnson Shipman, Serial Nos. 448,644, filed June 26, 1942, now Patent No. 2,540,617, issued February 6, 1951 and 583,916, filed March 21, 1945, now Patent No. 2,538,243, issued January 16, 1951, the latter application being a continuation-in-part of the former. The system disclosed in said applications provides a plurality of billing machines which may include auto-stop registers, integrating resettable registers, printing registers and means for printing a ticket showing the amount dispensed. In this system each of the billing machines may be selectively connected to any one of a plurality of loading stations. Each loading station comprises a measuring device, such as a fluid meter used when dispensing gasoline, means for controlling delivery of the material, such as the valve for controlling the flow of the gasoline, and means associated with these parts of the loading station so connected to the billing machines that automatic registration is effected and automatic control of the dispensing is accomplished by the register of the machine to which the meter has selectively been connected. Elements or buttons are provided in each billing machine which respectively are operable to connect that machine to the measuring devices corresponding to the selected element or button.

In the system disclosed in said applications means are disclosed which respectively are associated with the elements or buttons on the different machines and which are interconnected so that when a selected button on a given machine is maintained in actuated position to connect the given machine to a selected measuring device the button on a second machine which corresponds to the same measuring device is ineffective to connect this second machine to the selected measuring device until the first actuated element or button is released.

In the system as disclosed in the above mentioned applications the elements or buttons are effective to operate contacts which are connected in electric circuits with contacts actuated by the auto-stop registers and with electrically energizable means, such as solenoids, for operating the valves for controlling the flow of the fluid through a fluid meter. The arrangement of the circuits and contacts is such that by duplication of the apparatus any desired number of machines may be connected for operation in connection with the same meter, the circuits controlled by the selectively operable elements or buttons being arranged in parallel relation. While this parallel relation is advantageous for simplicity in providing for the addition of machines to the system as desired, it is found that the system may be improved by a rearrangement of the circuits in accordance with the present invention to prevent accidental or intended improper operation of the selectively actuatable elements or buttons resulting in erroneous registration of the amount of material delivered and preventing delivery of material except as registered and recorded by the selected machine.

It is an object of the invention to provide in dispensing apparatus an improved system of interconnection of billing machines with loading stations which insures that only the selected billing machine may be connected to the selected loading station at a given time.

A further object of the invention is to provide for selective connection of any of a plurality of billing machines to any of a plurality of loading stations, while insuring disconnection of all other machines connectible to the given loading station upon connection of the selected machine to the given station.

A more specific object of the invention is to prevent the connection or continued connection of a selected machine, and particularly of its auto-stop register, to the delivery control means at a given loading station which may occur in a system in which the machines are in parallel relation when an element or button on the selected machine corresponding to the given loading station is unactuated, or upon release of such element or button after actuation, with simultaneous or concomitant actuation of the button on a second machine corresponding to the same loading station.

Another object of the invention is to prevent actuation of the element or button on a second machine corresponding to a given loading station after a first button on a selected machine has been actuated to connect and is maintained in position connecting the first machine to the given loading station.

It is a further object of the invention to attain the above stated and other objects while maintaining the interlocking and interconnecting control features as well as the full unit of measurement delivery of material which are disclosed in said applications Serial Nos. 448,644 and 583,916.

The system of the invention utilizes controls similar to those disclosed in the earlier applications by which connection of the auto-stop register to the delivery control means or valves at the loading station is effected through conditioning means actuated by the selectively actuatable elements or buttons. This system is so arranged, however, that after initial actuation of a selected button on a selected machine having its auto-stop register in a position of setting other than zero such connection is discontinued when the selected button is released simultaneously or concomitantly with actuation of the corresponding button on a second machine. Otherwise stated, these controls are so arranged that operation of the delivery control means or valve associated with the measuring device at a given loading station cannot occur when the auto-stop register of a selected machine is set for operation and the button of a second machine for the same loading station is actuated as if to connect said second machine to said loading station whether or not the button on the first machine remains actuated or is deactuated.

In the electrical system disclosed in the earlier applications the circuits are arranged so that certain parts thereof are in parallel and the auto-stop register of a given machine and the delivery control means of a given loading station under certain conditions of operation of the buttons are connectible to each other through circuits which are in parallel, these circuits respectively including contacts which are actuated to open and closed positions upon actuation of the buttons with which they are associated which in normal operation prevent simultaneous connection of more than one machine to the given loading station. In the system of the present invention the conditioning contacts operated by the buttons on different machines which are associated with the same loading station are connected in circuit in series with each other and in series respectively with the contacts actuated by the auto-stops of the machines on which said buttons are located. While certain of the button actuated contacts of like function on the different machines are connected in parallel with each other to the delivery control means of the given loading station nevertheless, upon actuation of a button on a selected machine for a given loading station the delivery control means of that station is connected in series only to the circuit and to the auto-stop actuated contacts of the selected machine. Simultaneous or concomitant operation of buttons on two machines which are actuatable to connect these machines to the same meter or loading station effects complete disconnection of the machines and of the meters from each other. Thus, it is impossible inadvertently or by intention to operate the system by setting the auto-stop in a selected machine, actuating the button on this selected machine to connect this machine and its registers to a given loading station in the normal manner and then, before the auto-stop of this machine has returned to its initial or zero position, there to become effective to stop delivery and registration, operating the corresponding button on a second machine to connect the auto-stop of the selected machine to the same loading station for continued delivery of the material at said station. In the system of the present invention the auto-stop as well as the registers of a selected machine are connectible to any loading station but are only connectible on actuation of the single button which corresponds to the given loading station and which is associated with the selected machine with which said auto-stop and registers are associated.

Another feature of the invention is the provision of means associated with each element or button which is effective upon actuation of a selected element to prevent actuation of the element on a second machine which corresponds to the same loading station to which the first actuated element corresponds. The actuation preventing means associated respectively with these corresponding elements are so interconnected that upon actuation of one element the actuation preventing means of the other element is operated to intercept and prevent movement of this element of the second machine. The actuation preventing means of the present invention also preferably is operated under the control of the means, such as that disclosed in said applications Serial Nos. 448,644 and 583,916, which serves to hold the element in its actuated position. The element thus held in actuated position also may be utilized, if desired, as disclosed in said applications for effecting resetting and printing operations and for operation of locking members for preventing changing the setting of the auto-stop register after the dispensing operation has been initiated by actuation of a given element.

In the particular embodiment disclosed in said applications the means for holding the element or button in its actuated position includes electrically energizable means engaging the element and normally energized to effect the holding immediately upon actuation of the element. Such means may be utilized in the present invention. In the present invention in its preferred embodiment electrically energizable means also are used to prevent the simultaneous actuation of the corresponding elements or buttons in the different machines and these electrical means for the different machines are arranged in parallel with each other but in series with a contact actuated by the means for holding the selected button in its actuated position. Thus the several means for preventing actuation of the buttons in the different machines corresponding to a given loading station are energized upon the operation of any of said corresponding buttons on the different machines so as to prevent actuation of all except the selected button.

The invention may be more fully understood from the following description of the drawings in which.

Figure 1:
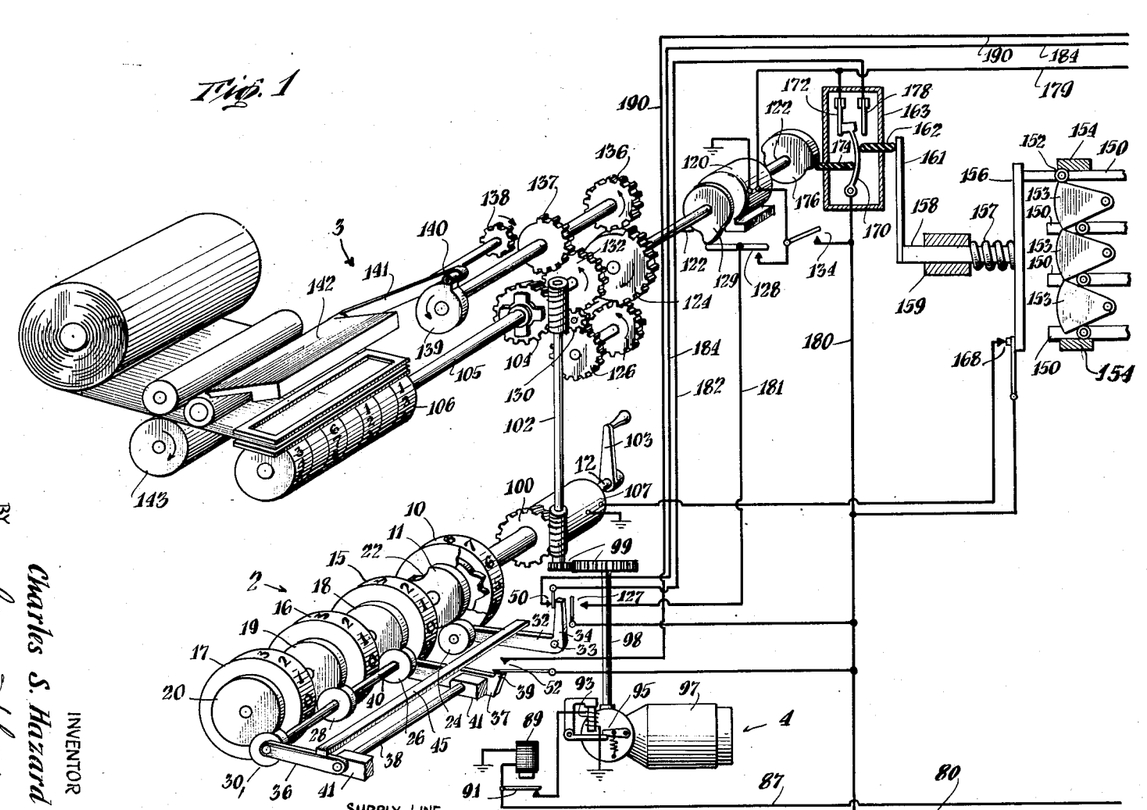
Fig. 1 shows a portion of a billing machine and its registers.
Figures 2, 4:
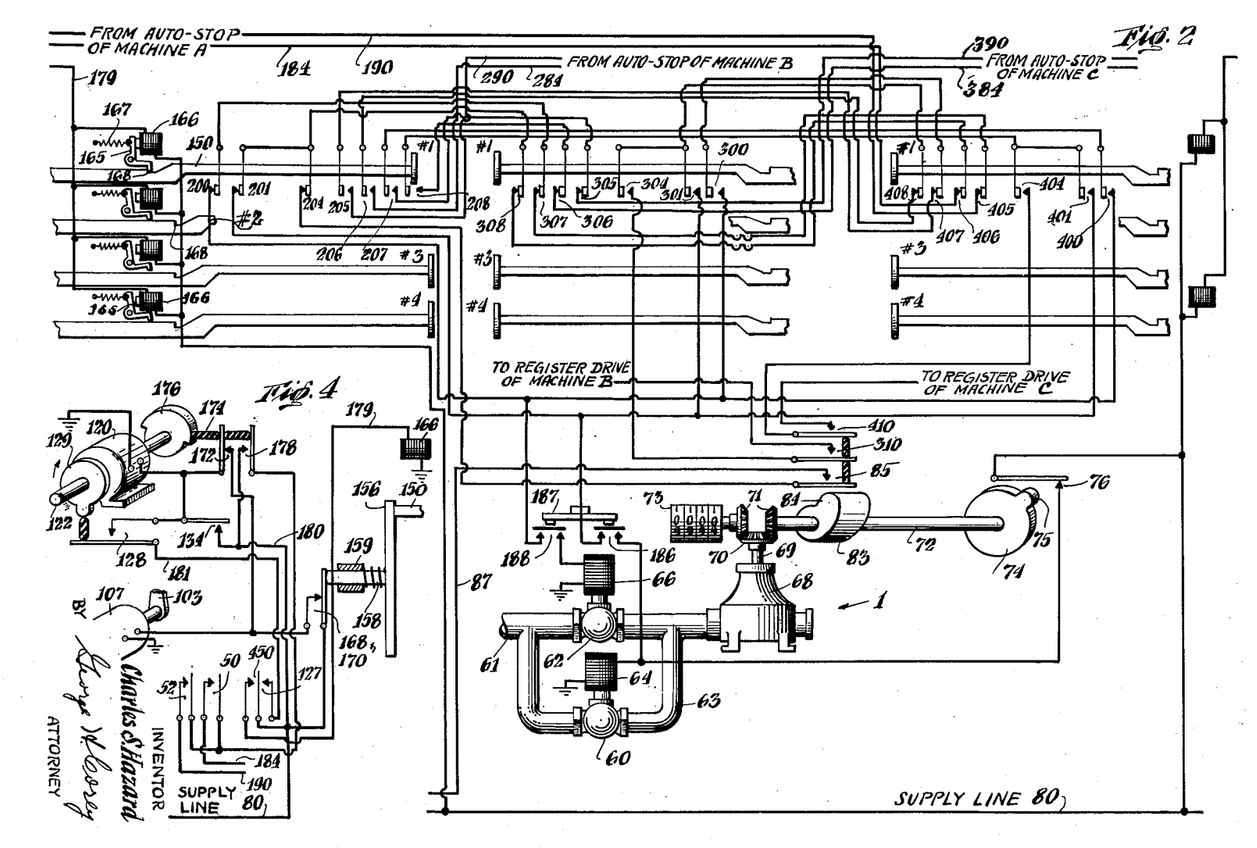
Fig. 2 shows three sets of selectively actuatable buttons of three billing machines for connecting said machines to the loading station shown in this figure.
Fig. 4 shows a modification of the circuits of Fig. 1 for controlling the resetting and printing operations in cooperation with the auto-stop register.

The lower portion of Fig. 2 diagrammatically shows the loading station 1 with its meter and control valves. The lower portion of Fig. 1 shows an auto-stop register 2 connected by a driving connection to the printing and recording section 3. In Fig. 1 the register driving means 4 is connected to drive both the auto-stop register and the recording register in a manner hereinafter described. In the upper righthand portion of Fig. 1 are shown means for resetting the recording and printing register and for carrying out the printing operation under control of the selectively actuatable means, that is the elements or buttons, identified respectively with loading stations #1, #2, #3 and #4. In Fig. 2 the elements #1, for each of the machines A, B and C diagrammatically represented in this figure are actuatable to connect the loading station 1 to any of the machines A, B and C. Fig. 1 taken in connection with Fig. 2 shows the actuable elements or buttons for machine A and the parts which are operated thereby. For each of machines B and C and any other machines which may be similarly connected in the system, the elements or buttons identified with a given loading station may be arranged for connecting said loading station to the machine of which the button is a part. For simplicity only the connections to loading station 1 are shown in Fig. 2 which are effected by actuation of button #1 on each of the three machines A, B and C.

The auto-stop register 2 is of conventional construction having units wheel 10 and a disc 11 associated therewith on a shaft 12. Mounted on this shaft also are the tens wheel 15 and wheels of higher order 16 and 17. Numeral wheels 15, 16 and 17 respectively have discs 18, 19 and 20 associated therewith. Construction of the wheels is conventional and the arrangement and interaction thereof are such that for each complete revolution of a units wheel 10 one-tenth of a revolution of the tens wheel 15 is produced. Correspondingly a complete revolution of the tens wheel 15 produces one-tenth of a revolution of hundreds wheel 16 and corresponding fractional movement of the wheel 17 of higher order.

The disc 11 associated with the units wheel 10 is provided with a notch or recess 22 to receive a roller 24 when the units wheel is in the zero position. In Fig. 1 the units wheel is shown set in position for dispensing of five units of measurement. Each of the discs 18, 19 and 20 also is provided with a notch recess 22 into which respectively the rollers 26, 28 and 30 enter when the wheels 15, 16 and 17 respectively are in the zero position. Roller 24 is carried on an arm 32 of the bell crank pivotally supported at 33 and having an arm 34 extending upwardly in Fig. 1. The rollers 26, 28 and 30 are carried in a frame having two arms 36 and 37 connected by rod 38 rigidly attached to said two arms. The rollers 26, 28 and 30 are mounted on a rod 40 so as to freely rotate thereon. The rods 38 and 40 and the arms 36 and 37 compose a rigid frame which is pivotally supported by bearings 41 adjacent the ends of the rod 38. All of the rollers 26, 28 and 30, therefore, move inwardly and outwardly from their positions in their recesses when any of the discs 18, 19 and 20 are rotated from the position shown in Fig. 1 to move its roller outwardly for engagement with the peripheral surface of the disc.

Across the frame and fastened on its arms 36 and 37 by suitable means, a bar 45 is provided with its end extending over the arm 32 which carries the roller 24. When the frame is pivotally moved by operation of any of the discs 18, 19, 20, the bar 45 is effective to depress or to hold the arm 32 in depressed position so that the roller 24 is held out of engagement with the notch 22 of disc 11 even though the wheel 10 is in position to bring this notch 22 in register with the roller 24. When, however, all of the rollers 26, 28 and 30 are returned into their respective recesses, the roller 24 then may enter the recess 22 when it next comes in register with the roller 24, thus permitting the arm 32 to rise pivoting on the pivot point 33.

The purposes of these pivotal movements of the frame which comprises arms 36, 37 and of the arm 32 is to operate contacts in electric circuits for effecting operation of the valves which control delivery of the fluid through the meter at the loading station, for example, the loading station #1 in Fig. 2. Adjacent the upwardly extending arm 34 of the bell crank 32 contact 50 is arranged, this contact being closed when, as shown in Fig. 1, the roller 24 associated with the units wheel is moved out of the recess 22 by counter clockwise movement of the bell crank upon setting of the auto-stop register. Upon return of the units wheel to zero position the contact 50 is opened by clockwise movement of the arm 34 when the roller 24 enters recess 22. Similarly the arm 37 has an upwardly projecting part 39 for engagement with the contact 52 arranged adjacent thereto to effect closing of this contact when the frame pivoted in bearings 41 is moved by rotation of one or more of the discs 18, 19 and 20 to move the rollers 26, 28 and 30 out of their respective recesses. As will be described hereafter, closing of the contact 50 is effective to open the valve 60 in the by-pass pipe leading to the meter 68 shown in Fig. 2 when the knob 187 is actuated by the driver or loading station attendant to close contact 186. The contact 52 when closed is effective when contact 188 is closed by actuation of the knob 187 to open the main valve 62 in the pipe leading to this meter. Closing of these contacts respectively energize solenoids 64 and 66 for operation of the valves 60 and 62 when the circuits are conditioned by actuation of the element or button corresponding to the loading station with which said button is identified and located in the machine with which the auto-stop is associated. The valves 60 and 62 in the embodiment being described are biased to their closed positions and the solenoids 64 and 66 are effective to open the valves against their bias when these solenoids are energized by completing the circuit under control of the auto-stop contacts 50 and 52.

Opening of the valve 60 or of both of the valves 60 and 62 which results from the operation of the auto-stop register causes the fluid, for example, gasoline or other liquid delivered under the pressure of a delivery pump, to flow through the meter 68 to produce metering operation thereof. Rotation of the operating parts of the meter rotates the shaft 69 and the bevel gears 70 and 71 to rotate the shaft 72 and to operate the visual register 73.

Carried on the shaft 72 is a suitable cam 83 formed with toe 84 for intermittently operating contact 85 which is connected as will be hereafter described with the auto-stop operated contact 50 and through the lead 87 to the register driving means 4 shown in Fig. 1. The lead 87 is connected through relay 89 to ground and also to the armature actuated contact 91 of said relay. This relay 89 is of time-delay type which leaves the contact 91 closed for a limited time, thus permitting the relay 93 to be energized intermittently to actuate the clutch 95 intermittently so as to transmit the rotation of the constantly running motor 97 through the shaft 98 and the gearing 99 to the worm and wheel drive 100 driving the auto-stop in step by step manner. The register driving means 4 is thus effective to drive the auto-stop register in step by step movement corresponding to the rotation of the shaft 72. This shaft 72 in the particular embodiment being described is rotated once for each unit of measurement of the fluid passing through the meter. An impulse is thus transmitted to the register driving means 4 once in each unit of measurement made by the meter. The units wheel 10 of the auto-stop register, therefore, is rotated one unit of its rotation, that is, the angular distance between two numerals thereon, for each full rotation of the shaft 72 and of the cam 83. Through the shaft 102 and the worm and wheel drive 104 the register 106 likewise is driven in step by step movement to integrate the amount of the fluid passing through the meter 68.

Rotation of the shaft 72 also rotates cam 74 arranged for actuation of contact 76 to open position when the toe 75 of the cam is brought into engagement with the contact 76. During the greater part of a revolution of shaft 72 the contact 76 is closed, thus completing the circuit from the electric supply line 80 through the solenoid 64 to the ground as shown in Fig. 2. Thus, when the valves have been opened by closing of the auto-stop contacts 50 and 52 upon setting thereof and pressing element or button #1 corresponding to the loading station #1 in Fig. 2, and upon actuating knob 187, the shaft 72 is rotated and the toe of the cam 74 opens the contact 76 once in each revolution of the shaft 72, that is, once for each unit of measurement of the fluid delivered through the meter 68. The valve 60 at this instant would close under its bias if it were not held opened by the solenoid 64 energized through closed contact 50. For the balance of the revolution of the shaft 72, the fluid continuing to flow through the meter, the valve 60 is maintained in the open position, the solenoid 64 being energized through both contacts 50 and 76. If, however, the circuit controlled by the auto-stop control contact 50 is opened by return of the auto-stop to zero with the roller 24 in the recess 22, thus breaking the circuit from the auto-stop contact 50 to the solenoid 64, the valve 60 will be closed at the completion of the last unit of measurement by the meter, since the contact 76 remains closed throughout the delivery of this last unit but is opened upon completion of this unit, thereby to de-energize the solenoid 64 and effect final closure of the valve 60.

The register 106 preferably is of the resetting type and may be reset by rotation of the motor 120 rotating shaft 122. When the shaft 122 rotates, the mutilated gear 124 drives through gears 126, the pinion 130 and gear 132 to drive the shaft 105, a friction drive of conventional type being provided to permit the rotation of the register in the resetting operation. Further reference to this resetting operation will be made hereafter.

When in completing a dispensing operation the auto-stop register returns to zero the motor 120 becomes energized by closing of contact 127 actuated by the auto-stop register 2. This contact is connected in series through leads 180 and 181 from the supply 80 to contact 128 actuated by a cam 129 on motor shaft 122, the contact 128 being connected to motor 120. The cam 129 in Fig. 1 is shown in the position which it occupies when the printing of the record of the previous dispensing operation has been completed and the apparatus is about to start resetting of the register 106, the button or element #1 of machine A having been pressed. In the resetting operation the cam 129 is rotated through 180 degrees from the position shown and permits contact 128 to close. Printing of the record of the dispensed and registered amount will be effected, therefore, upon return of the auto-stop register 2 to zero which closes contacts 127 and completes the circuit to the motor 120. Thus energization of motor 120 effects rotation of the mutilated gear 124, from the position at 180° from that shown in Fig. 1, into engagement with gear 136, thereby to rotate the mutilated gear 137 to engage pinion 138 for effecting feeding movement of the paper by rotation of roll 143 after cam 139 engaging cam bowl 140 has effected movement of arm 141 to bring the printing hammer 142 downward to press the paper into contact with the printing elements of the register 108.

Figure 5:
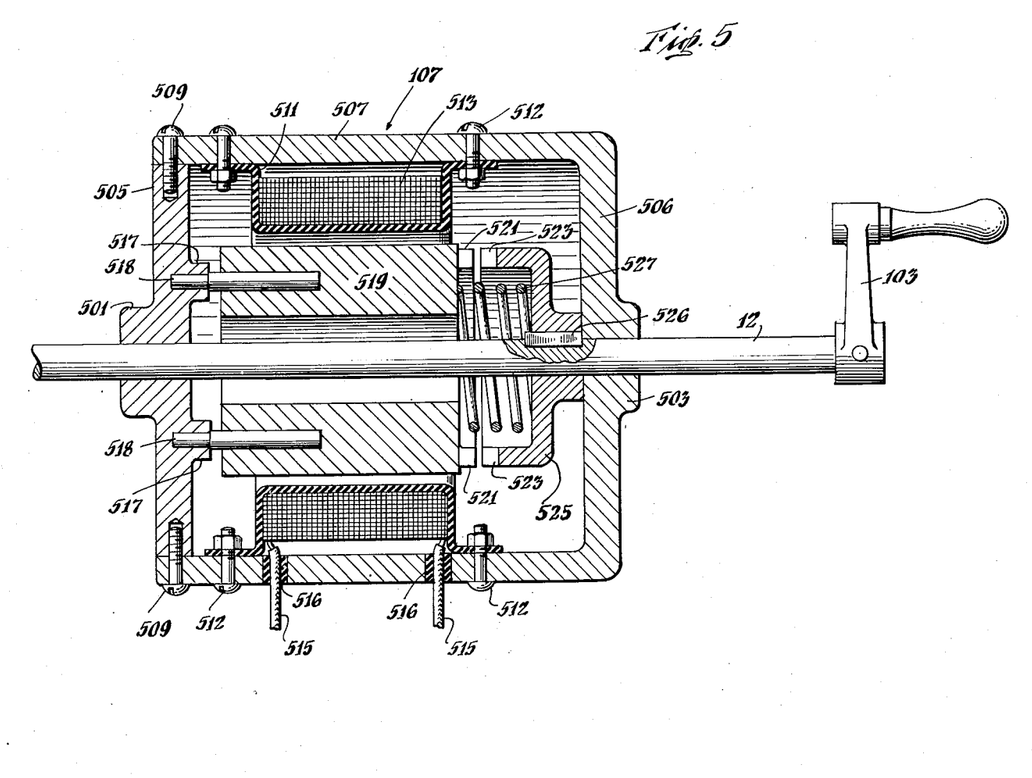
Fig. 5 shows the construction of the auto-stop register locking means.

In preparing the apparatus for dispensing operation the auto-stop register 2 may be set to the amount to be dispensed by operation of the crank 103 fastened on shaft 12. The register driving means 4 then is effective when energized to drive the auto-stop register from the set position to the zero position, so that roller 24 may reenter the notch or recess 22 when the other rollers 26, 38 and 30 also are in their respective recesses, thus to open the contacts 50 and 52. The auto-stop register is provided with means hereafter described in connection with Fig. 5 for preventing change of the setting. This preventing means in the embodiment diagrammatically illustrated in Fig. 1 may be an electromagnetic grip 107 effective to prevent rotation of the shaft 12 to which the crank 103 is attached. This electromagnetic grip 107, hereinafter described in connection with Fig. 5, is energized upon actuation of any of the elements or buttons identified with the different loading stations which are associated with the machine with which the auto-stop is associated.

The operation of these elements and the parts actuated thereby now will be described. The element or button in machine A identified as #1 in Fig. 2 corresponds to the loading station #1 shown in this figure. This element is shown in actuated position. The extensions of the elements shown in Fig. 2 and identified with loading stations #1, #2, #3 and #4 which are associated with machine A are shown in Fig. 1. Element 150, identified with loading station #1 shown in actuated position in Figs. 1 and 2, is effective in this position to bring the cam roller 152 carried by said element into engagement with the cam 153 and the stationary member 154. The several cams 153 are thus brought into engagement with each other to prevent further movement thereof. Actuation of the elements 150 which are associated respectively with the other loading stations #2, #3 and #4 thus is prevented. This device as described in said applications Serial Nos. 448,644 and 583,916 is effective to prevent connection of the same machine to more than one meter at the same time.

As shown in Fig. 1, the element 150 which is in actuated position presses the vertically positioned member 156 toward the left against the spring 157, this member being carried on a shaft 158 slidably supported in a bearing 159. Attached to the lefthand end of the shaft 158 is a vertically extending arm 161 engaging a pin 162 slidable through the wall of the switch box 163 to actuate the switch as will hereafter be described. By means of a latch 165, Fig. 2, associated with each element 150 and operated by a solenoid 166, the elements are held in the actuated position, for example, in machine A when moved toward the left to the position shown for the element 150 corresponding to loading station #1 in Figs. 1 and 2. The solenoids 166 are connected in parallel with each other and as a whole in series through lead 179 with the motor 120 between the line 80 and ground. The resistances of the solenoids 166 and of the motor 120 are such that the solenoids at all times are effective to actuate the latches 165 against the bias of the spring 167 with the current in the motor 120 so reduced that rotation thereof is not produced except when the solenoids are short-circuited by connecting the motor through the switch contact 172 within the switch box 163 or upon closing of contacts 127 and 128 for printing as above described or by operation of the hand switch 134. Upon such short-circuiting of the solenoids by operation of any of these switches, the solenoids 166 are de-energized so as to be ineffective to hold the latches against the pull of the springs 167, thus to release any element which has been actuated to the position which is shown for the element #1 in Figs. 1 and 2.

At the lower end of the vertically arranged member 156 which is actuatable by any of the elements 150 to operate the switch blade 170 within the switch box 163, is arranged a contact 168 actuated to closed position when the vertical member 156 is moved toward the left in Fig. 1 by such actuation of any of the elements 150. Closing of this contact 168 establishes connection from the line 80 through the electromagnetic gripping means 107 to ground and thus energizes the gripping means to prevent further operation of the crank 103 to change the setting of the auto-stop register when any element or button 150 has been pressed. Thus, when the auto-stop register first has been set to a predetermined setting corresponding to the amount of fluid desired to be dispensed and the element or button corresponding to the loading station through which this fluid is to be dispensed then is actuated, the auto-stop is locked against change in its setting as long as the element remains in actuated position.

In resetting of register 106 and conditioning of the apparatus for dispensing operation, the pin 162 is pressed inwardly in the box 163 upon actuation of an element 150 to move the blade 170 of the switch contained within the box 163 into engagement with the contact 172 shown at the left in this box in Fig. 1. This contact establishes connection from the line 80 through the motor 120, short-circuiting the solenoids 166 and effecting rotation of the motor. The position of the gear 124 on the shaft 122 is such that upon actuation of the blade 170 into engagement with the contact 172 the gear 124 is brought into mesh with the gear 126 to drive the register 106 in resetting operation, that is, to bring the register to its zero position preparatory for a dispensing operation. The pin 162 is effective to bend the blade 170 in the position shown in Fig. 1 with the end of a pin 174 as a fulcrum, this pin 174 extending through the opposite side of the box 163 from pin 162 into engagement with the blade 170.

On the shaft 122 of the motor 120 a cam 176 is arranged having the lobe of larger radius positioned as shown in Fig. 1 holding the pin 174 inwardly in the box 163. Upon rotation of the shaft 122 from the position shown in Fig. 1, when the motor is energized as just described by bringing the blade 170 into engagement with the contact 172, the cam 176 is rotated approximately 180° during the resetting operation of the register 106. This brings the cam 176 into the position where the end of the pin 174 has just moved from engagement with the surface of the larger lobe of the cam to the surface of the smaller lobe. As the blade 170 is of spring material, this blade straightens from the bent position shown in Fig. 1 still bearing on the inner end of the pin 162 to bring the blade into engagement with the righthand contact 178 of the switch box 163. Such engagement of the blade 170 establishes a connection from the supply line 80 to the contact 50 of the auto-stop which is actuated by the upwardly extending arm 34 of the bell crank 32.

When the auto-stop has been set to close the contact 50 in the manner above described, the circuit is then completed from the supply 80 through the lines 180, 182, 184 to contacts which are actuated by the elements or buttons located in the different machines A, B and C and corresponding to this same loading station #1 for which the element or button is actuated as shown in Figs. 1 and 2. These element actuated contacts are so interconnected from one machine to the other while all being connected to establish the control of the same loading station that the circuit is only established from a selected machine, that is, from its auto-stop, to the loading station corresponding to the element or button which is actuated on the selected machine. The arrangement of the circuits and connections is such that actuation of any other button associated with the same loading station but on a different machine is effective to disconnect the whole system from the given loading station. Moreover, when the auto-stop on a selected machine has been set and a button on said machine corresponding to a given loading station, for example loading station #1 has been actuated, actuation of any other button on any other machine whether or not the first actuated button on the selected machine has been released, is ineffective to connect the auto-stop of the selected machine to the given loading station. It thus is not possible in the system of this invention improperly to dispense the fluid through the meter of a loading station, for example, by setting the auto-stop of machine A, actuating the button on machine A corresponding to the loading station #1 for a certain part of the dispensing operation, thereafter releasing said button by operation of the switch 134 or otherwise, and simultaneously or concomitantly operating the button corresponding to loading station #1 on machine B to continue the dispensing through the same meter but without completing the registering and recording on machine A initially selected.

These results of preventing improper operation are accomplished because the contacts which are actuated by the elements or buttons #1, #2, #3, #4 of the several machines A, B, C, as shown in Fig. 2, and which will now be described are in a series arrangement in the circuits instead of being in part in a parallel arrangement as in the system disclosed in the applications Serial Nos. 448,644 and 583,916. A certain number of these contacts may be termed auxiliary contacts. The number of auxiliary contacts provided for each element or button identified with a given loading station depends upon the number of machines which are connectible to the given loading station. The number of auxiliary contacts required to be connected in series with each auto-stop operated contact of a selected machine is one less than the number of machines having elements or buttons actuatable selectively to connect said machines to the given loading station and these auxiliary contacts are carried by the respective elements other than that of the selected machine. Where, as in the embodiment being described, three machines are arranged for connection, two auxiliary contacts, one in each of the other machines, are provided for each of the auto-stop register actuated contacts 50 and 52. Thus, in this particular embodiment, the total number of auxiliary contacts carried by each element is four. The auxiliary contacts carried by element #1 of machine C, for example, are 405, 406, for machine A and 407, 408 for machine B. In addition to these auxiliary contacts other contacts are actuated by the same button of the selected machine to condition the connection between its auto-stop register and the solenoids 64 and 66 operating the valves 60 and 62 for controlling the flow of the fluid through the meter of the given loading station. Contacts also are provided which are actuated by the elements or buttons for conditioning the circuit which is intermittently closed to the register drive by the operation of the meter driven cam 83 to produce the step by step operation of the registers as above described.

The circuit initially established by the engagement of the blade 170 with the contact 178 and the closing of the auto-stop register contact 50 is completed through the lead 184 which connects to contact 406 of machine C and then to contact 308 of machine B and then to contacts 201 and 204 of machine A. From the contact 201 connection is made to the hand operated switch 186 which may be closed by the loading station operator or the driver when delivery is to be taken. Upon operation of the knob 187 switch 186 may be closed and the solenoid 64 energized to open the valve 60. This valve will be opened if the auto-stop register is set to a setting less than ten units, that is, without rotation of the wheels 15, 16 and 17 and their associated discs 18, 19 and 20. With such a setting only the roller 24 will be moved out of the recess 20 and to close the contact 50. If, however, the setting of the auto-stop register is for an amount greater than ten units, one or more of the wheels 15, 16, 17 will be rotated and the frame comprising the arms 36, 37 will be pivotally moved in bearings 41. The contact 52 then also will be closed by engagement of the upwardly extending part 39 of the lever 37. Closure of the contact 52 establishes a connection from the supply line 80 through the lead 190. This lead connects to the contact 405 of machine C and then to the contact 307 of machine B and then to the contact 200 of machine A. From the contact 200 the connection is continued to the switch 188 which also is operable to closed position upon operation of the knob 187, thus to energize the solenoid 66 and to open the valve 62.

It will now be apparent that both of the valves 60 and 62 will be opened by closure of the contacts 50 and 52 when the amount to be dispensed is greater than ten units but that only the valve 60 will be open by connection of the contact 50 when the amount to be dispensed is less than ten units, these amounts being determined by the setting of the auto-stop register. It also will be apparent that the above described operation of the contact 76 intermittently by the meter driven cam 74 is effective to complete delivery in full units of measurement by closing the valve 60 precisely upon completion of the last unit of measurement as determined by the meter, the cam 74 being set on the shaft 72 so as to effect opening of the contact 76 to de-energize the solenoid 64 just as flow of the last full unit is completed. The circuit established by the operation of the auto-stop actuated contact 50 through the contact 204, as above mentioned, is completed intermittently by the operation of the contact 85 actuated by the cam 83 to effect operation of the register drive 4.

Similar circuits from machine B are provided by leads 284 and 290 for connecting the auto-stop register actuated contacts of machine B to loading station #1 upon operation of the button #1 of machine B. The lead 284 connects from contact 50 (not shown) for machine B through the contact 206 of machine A and then to contact 408 of machine C and then to contacts 301 and 304 of machine B. The contact 301 is connected to the switch 186 for controlling operation of the same solenoid 64 and of valve 60 as does contact 201 of machine A as above described. The contact 304 is connected to contact 310 which is actuated intermittently by the cam 83 similarly to the contact 85 to operate the register drive 4 of machine B (not shown) corresponding to the drive 4 of machine A as shown in Fig. 1.

Actuation of button #1 for machine B when buttons #1 of both machine A and machine C are in the unactuated position provides for completion of the circuit through these contacts, the contacts 206 on machine A and 408 on machine C being closed when the buttons #1 on machines A and C are in the unactuated position. Actuation of the button #1 on machine B also closes contacts 301 and 304 which are in series with contacts 206 and 408 and completes the circuits respectively to the solenoid 64 to open valve 60 and to the register drive 4 of machine B. With button #1 in machine B in the actuated position contact 300 also is closed while contact 205 of machine A and contact 407 of machine B are closed, buttons #1 on machines A and C being in the unactuated position.

Similar circuits are provided by leads 384 and 390 connecting from the the auto-stop register of machine C. The lead 384 connects from a contact 50 on machine C (not shown) through contact 306 machine B, contact 208 machine A to contacts 401 and 404 machine C respectively connected to solenoid 64 for operating valve 60 and to contact 410 for operating the register drive of machine C. The lead 390 connects from a contact 52 on machine C (not shown) through contact 305 machine B, contact 207 machine A, and contact 400 machine C to solenoid 66 for operating valve 62.

It will be understood that when any button on any machine is actuated certain contacts are closed and certain others are opened. When button #1 of machine A, for example, as shown in Fig. 2, is in the actuated position the contacts 200, 201 and 204 are closed and the contacts 205, 206, 207 and 208 are open. Similarly on machine B contacts 300, 301 and 304 are respectively closed and opened by actuation of button #1 of machine B when contacts 305, 306, 307 and 308 are opened and closed. The same relation is provided in machine C with respect to contacts 400, 401 and 404 on the one hand and contacts 405, 406, 407 and 408 on the other hand.

In consideration of the connections between contacts actuated by buttons on the different machines which are identified with a given loading station and of the number of contacts provided which are thus connected in series, as well as of the provision that contacts closed by an actuated button are in series with contacts on all of the other machines which respectively are closed when their buttons are in the unactuated position, the circuit is only conditioned for completion through to the solenoids for opening the valves by setting of the auto-stop register when a single button is actuated. Actuation of two buttons simultaneously will break the circuit through the contacts of all of the other buttons. Dispensing of the material at the loading station, therefore, is stopped upon the actuation of a second button while a first is in the actuated position and operation of all the registers is stopped since the connection to register drive also is broken. Moreover, actuation of a second button, that is of the button upon a second machine, for example machine B, for connecting to the same loading station, for example loading station #1, after the auto-stop on the first machine, say machine A, has been set to an amount to be dispensed, is ineffective to establish connection to the solenoids 64 and 66 from the auto-stop of machine A since the contacts 307 and 308 of machine B will be opened when button #1 of machine B is actuated. Similarly if button #1 of machine C were actuated while button #1 of machine A is pressed the contacts 405 and 406, which are in series respectively with contacts 307 and 308 and with the auto-stop actuated contacts 50 and 52 of machine A, will be opened to prevent completion of the circuit. Only when buttons #1 of both unselected machines, machines B and C, for example, are unactuated and button #1 of the selected machine A is pressed can the circuit be conditioned for completion from the auto-stop of machine A to the valves 60 and 62 as well as to the cam operated contact 85 and thence back to the register driving means 4 of machine A.

It will be found by tracing the circuits for the leads 284 and 290 and leads 384 and 390 respectively for the machines B and C through the contacts which are identified respectively for machines A, B and C by the series of numerals 200 to 208, 300 to 308, and 400 to 408 that the invention provides the safeguard which has above been described which prevents faulty operation of the system and insures operation of only one register at a time connected to the meter at only one loading station while also providing for the connection of any other single register to any other single meter. Such connection of other registers and meters is accomplished by actuation of the elements or buttons #2, #3 and #4 on the respective machines A, B and C.

Figure 3:
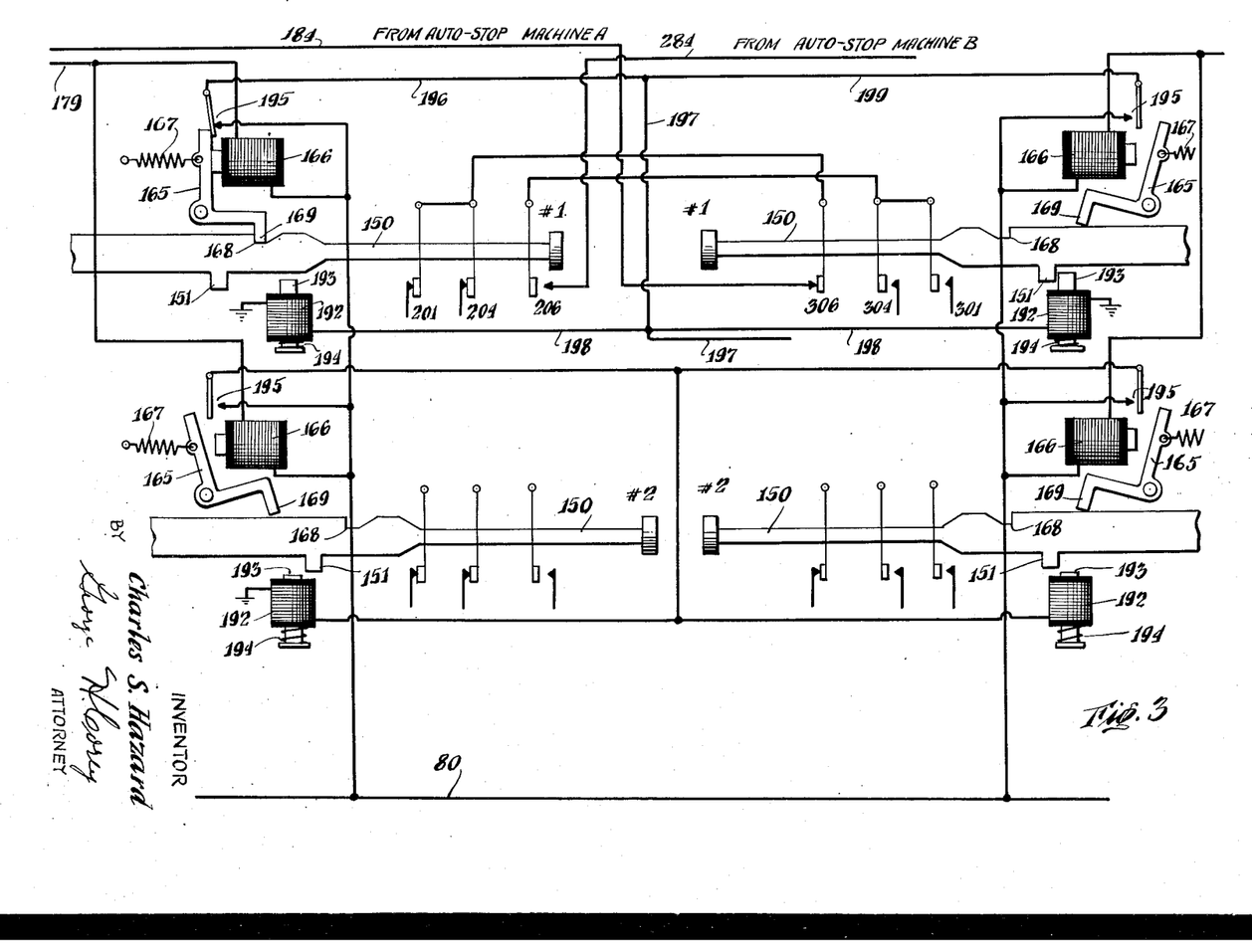
Fig. 3 shows a diagrammatic arrangement of the buttons of two billing machines with the means for preventing simultaneous actuation of the buttons on the two machines which connect these machines to the same loading station.

In Fig. 3 is shown a schematic arrangement of latches 165 operated by solenoids 166 for holding the actuatable elements or buttons 150 in the actuated position as above mentioned. At the left hand of Fig. 3 are shown the buttons for connecting machine A to loading stations #1 and #2, the button #1 being in the actuated position and button #2 being in the unactuated position. At the right hand of Fig. 3 are shown the latches 165, solenoids 166 and element 150 for machine B with the elements or buttons for both loading stations #1 and #2 in the unactuated position. As in the arrangement shown in Fig. 2, solenoids 166 for each machine are connected in parallel with each other and may be connected as a group in series from the supply line 80 to the motor 120 through lead 179. Operation of the solenoids 166 in Fig. 3 is the same as that described in connection with Fig. 2, these solenoids being de-energized by being short-circuited upon operation of the motor 120 by actuation of switch blade 170 or by the hand operated switch 134. Upon being de-energized the solenoids 166 release the latches 165 under the pull of spring 167. Upon completion of the operation of the motor, thus re-energizing the solenoids 166, the latches 165 tend to be drawn to the position shown for element 150 on machine A identified with loading station #1 in Fig. 3, that is with the toe 169 in engagement with the notch 168, but are prevented from taking this position when this element is in the unactuated position by contact of the toe 169 of said latch with the edge of the element 150. This position of the latch is shown for the element identified with loading station #2 of machine A. Upon actuation of any element, the toe 169 of the latch 165 is immediately moved into the notch 168 after said notch has moved past the toe of the latch. The latch thus is effective to hold the element in its actuated position.

Actuation of an element, for example, element 150 corresponding to loading station #1 in Fig. 3, closes the contacts 201 and 204 and opens contact 206 in the same manner as described above for like numbered contacts in connection with Fig. 2. The circuits in Fig. 3 are shown for connection only to the auto-stop actuated contact 50 of a system utilizing only two machines, A and B, and two loading stations, #1 and #2, through leads 184 and 284. The arrangement of the circuits for multiple machines and stations as described in connection with Figs. 1 and 2, however, may include the features of the invention about to be described and shown in Fig. 3.

Beneath each of the elements 150 in Fig. 3 is shown a solenoid 192 having its movable core 193 biased downwardly by spring 194, the upper end of the core being in position to engage lug 151 on element 150 when the solenoid 192 is energized to move the core upwardly while compressing the spring 194. When the core 193 is in this upper position, as will be seen at the right hand of Fig. 3, the element 150 identified with loading station #1 on machine B may not be operated, the lug 151 being brought into engagement with the core 193 if such actuation of the element 150 is attempted. Upon operation of any element initially, for example the element 150 identified with loading station #1 on machine A at the left hand of Fig. 3, the lug 151 is moved past the core 193 of the solenoid 192 before the core is lifted by energization of the solenoid 192 as will be understood from further description.

Adjacent the end of the upwardly extending arm of the latch 165 a contact 195 is arranged which is actuated to closed position when the energized solenoid 166 becomes effective to pull the latch into position with the toe 169 thereof in the notch 168 upon actuation of element 150. The latch 165 and contact 195 associated therewith for the element or button on machine A which is identified with loading station #1 are shown in this position in Fig. 3. When the latch is held with the toe 169 thereof in contact with the edge of the unactuated element 150 as shown in Fig. 3 for the element or button identified with the loading station #1 on machine B or for loading station #2 on machine A, the contact 195 is opened. As long as the corresponding button on another machine is in the unactuated position, the toe 169 of the latch 165 associated with such other button prevents its latch being pulled into position to close the contact 195 on such other machine. It will be apparent, therefore, in consideration of the interlock provided by cams 153, Fig. 1, that upon operation of any selected button only one contact 195 may be closed on the selected machine and that will be for the button for connecting a given loading to said machine.

The contacts 195, however, which are associated with buttons identified with the same loading station but on two different machines, are connected from the supply 80 in parallel with each other but each one of said contacts is connected in series with the solenoids 192 which respectively are associated with the machines with which said buttons are associated, these solenoids being connected in parallel. Thus, the contact 195 shown in the closed position for machine A and for button #1 in the upper left hand part of Fig. 3 is connected through leads 196, 197 and 198 to both of the solenoids 192 which are associated respectively with machines A and B. Similarly actuation of the contact 195 on machine B by the latch 165 upon actuation of button #1 on machine B establishes the circuit through leads 199, 197 and 198 to these same solenoids 192 for these same buttons numbered #1 on the two machines. Actuation of either of the buttons #1 on these two machines A or B is effective to energize the solenoids 192 of both machines, but particularly of the other machine, and to raise the cores to prevent actuation of said other button identified with the same loading station on the other machine. It is a feature of the invention that actuation of any element or button on a selected machine corresponding to a given loading station prevents actuation of any element or button of any other machine which corresponds to the same loading station. It will be apparent without further description that the circuits for the solenoids 192 which are associated with machines A and B and with buttons identified with the loading station #2 are similarly connected and operable in the same manner as for those associated with button #1.

To extend the system to additional machines, connections may be made to lead 197 from contacts 195 and solenoids 192 associated with the elements or buttons identified with the same loading station on any number of such additional machines. It will be apparent that lead 197 carries the same potential as leads 196, 198 and 199 and, therefore, only a single lead is necessary to connect in parallel to the circuits in additional machines which are equivalent to the circuits shown for machines A and B in Fig. 3.

The devices and their interconnection as shown in Fig. 3 which are effective to prevent connection of a second machine to the same loading station as that to which a first machine is connected supplement the arrangement of circuits disclosed in connection with Figs. 1 and 2 which prevent simultaneous completion of the circuit for connection of the same loading station to more than one machine. The operator controlling the operation of the machines, which may be located in a central office, once he has made a selection of the loading station and has actuated the button therefor on a selected machine, is automatically prevented from actuating a second button. He may set the auto-stop register and thereafter actuate a button on a selected machine identified with a given loading station. Thereafter in the system and apparatus represented in Fig. 3 he cannot operate any button on a second machine connected to the same loading station. By virtue of the interlocks provided by the cams 153, he also cannot operate a second button on the same machine to connect a different loading station to a selected machine. These means for preventing improper operation become released upon completion of the dispensing operation concomitantly with return of the auto-stop register to zero as above described.

In Fig. 4 is shown a system which is a modification of that shown in Fig. 1, certain of the parts of the apparatus illustrated in Fig. 1 being omitted for the sake of simplicity. In this figure like parts are given the same numerals as in Fig. 1. In Fig. 4 the motor 120 is operable to effect the resetting operation of the register as well as the printing operation in proper relation to the operation of the auto-stop register, as described in connection with Fig. 1. Fig. 4 shows a system of circuits connected to the auto-stop register contacts 50 and 52 which respectively are actuated by the bell crank 32 and the arm 37 which in turn are operated by the discs 11, 18, 19 and 20 of the auto-stop register as described in connection with Fig. 1. The motor 120 drives the shaft 122 which may be connected through gearing such as that shown in Fig. 1 to the resettable register 106 and to the printing devices associated therewith as illustrated at 3 in Fig. 1.

On actuating a button or element 150, in the manner described in connection with Fig. 1, to move the vertical member 156 toward the left in the arrangement shown in Fig. 4, the shaft 158 which is slidable in bearing 159 closes the contact 168 which is connected in series with a contact 172 and motor 120 between the supply line 80 and ground. Such actuation of the button 150, therefore, is effective to energize the motor 120 to rotate the cams 176 and 129 to a position 180° from that shown in Fig. 4. During such rotation of the cam 176 in the direction shown by the arrow in Fig. 4 contact 172 remains closed until the pin 174, engaging the larger lobe of cam 176 and which is biased toward the left in Fig. 4, is engaged by the smaller lobe of the cam 176 to effect opening of the contact 172. Upon such opening of the contact 172 the circuit to the motor 120 is interrupted and the motor stops. In this rotation of 180° the toe of the cam 129 moves from engagement with the contact 128 to effect closing of this contact to condition the circuit for further energization of the motor 120 to effect the printing operation in the manner described in connection with Fig. 1. Such further energization of the motor 120, however, does not occur until the auto-stop register has returned to its initial or zero position to effect closing of the contact 127 to complete the circuit from the supply line 80 through lead 181 and contact 128 to the motor 120.

Closing of the contact 168 by actuation of an element 150 also closes a circuit from the supply line 80 to the electromagnetic grip 107. Thus, after the auto-stop register first has been set by operation of the crank 103, as described in connection with Fig. 1, and the selected button 150 then is pressed, the auto-stop register is locked against change in the setting as long as the button or element 150 is maintained in depressed or actuated position. Upon completion of the resetting operation of the motor 120, when the cam 176 opens the contact 172, as above mentioned, this cam also is effective to close the contact 178 which is connected from the supply line 80 in series with the pair of the contacts 50 and 52 which are connected in parallel with each other and respectively to the leads 184 and 190 and which are actuated by the auto-stop register as above stated.

In order to maintain the contact 168 closed, thereby to maintain the electromagnetic grip 107 energized as well as to maintain the connection of the selected meter or loading station to the selected billing machine which is effected by the series connected element actuated contacts, and, moreover, to maintain the circuit to the motor 120 closed until the resetting operation is completed, a contact 450 is provided which is actuated to closed position by the auto-stop register in the presetting operation thereof. The contact 450 is connected in series with the group of solenoids 166 which may be connected in parallel as shown in Fig. 1 and which respectively are associated with the buttons or elements 150. For simplicity only one of the solenoids 166 is shown in Fig. 4 but these solenoids are effective to hold the latch 165 in engagement with the notch 168 in the element 150 in the manner shown and described in connection with Fig. 2.

The contact 450 and the solenoids 166 are connected between the supply line 80 and the ground. Upon setting of the auto-stop register, therefore, and without regard to actuation or operation of other parts of the apparatus the solenoids 166 are energized and maintained energized until the auto-stop register is returned to its zero position, whereupon the contact 450 is opened concomitantly with closing of the contact 127 as above described to effect the printing operation. Thus, the actuated element or button 150 is maintained in the depressed position as soon as such element 150 is actuated, since the auto-stop register must be set prior to actuation of the button 150 because the electromagnetic grip after actuation of the button 150 prevents operation of the crank 103 to effect setting of the auto-stop register. The operator must, therefore, first set the auto-stop register of the billing machine which is to be used and then must depress the button or element 150 on this machine which serves to connect the selected meter or loading station to the selected billing machine. As soon as the button or element 150 is actuated, it will be held in the actuated position by the energized solenoid 166 but will be immediately released by deenergization of this solenoid upon opening of the contact 450 when the auto-stop register is returned to zero.

The lead 184 may be connected in series with the contacts 406, 308, 201 and 204 and the lead 190 may be connected in series with the contacts 405, 307, 200 located in machines C, B and A and arranged to function in the manner described in connection with Figs. 1 and 2. Closing of the contact 178, therefore, conditions the circuits leading to the button actuated contacts which are located in the respective machines and which are effective to connect the auto-stop register of the selected billing machine to the selected meter or loading station. When the auto-stop register has returned to zero from the position in which it was set prior to actuation of a button or element 150, the contacts 52 and 50 will be opened and the valves 62 and 60 will be operated in the manner above described to cut off the flow through the meter precisely upon completion of the last unit of measurement by the meter of fluid flowing therethrough corresponding to the amount for which the auto-stop register was set.

The system of circuits shown in Fig. 4 is designed to provide for a possible condition which may arise when a button or element 150 is actuated at the same instant that the loading station operator or the driver presses the knob 187, Fig. 2, to close the contacts 186 and 188 to initiate delivery of the fluid through the valves 60 and 62. Although such a condition may not often develop, especially where the loading station is located at a distance from the billing machine and where the parts of the apparatus located at these two places are operated by different persons, nevertheless the system shown in Fig. 4 provides for such a contingency and prevents the initiation of the delivery of the fluid until the resetting operation of the resettable register is completed.

In the system of circuits shown in Fig. 4, since the contact 178 is connected in series with both contacts 50 and 52 which are actuated by the auto-stop register, the circuit cannot be completed to the solenoids 64 and 66 by the operation of the knob 187 until the contact 178 is closed. Such closure is effected by the movement of the cam 176 from the position shown in Fig. 4 during the resetting operation to the position where the pin 174 is in engagement with the smaller lobe of the cam 176 to open contact 172 and close contact 178 as above described. Immediately upon closing of the contact 178, however, delivery of the fluid may be started. If the attendant or driver at the loading station should have pressed the knob 187 and held it so as to maintain the contacts 186 and 188 closed, delivery of the fluid would start immediately and automatically upon completion of the resetting operation which has been effected by actuation of the element or button 150 pressed by the operator at the billing machine. It will be apparent that the arrangement shown in Fig. 4, therefore, provides for automaticity in the operation of apparatus such as that shown in Fig. 1, while also avoiding the undesirable condition of unregistered delivery of fluid as a result of simultaneous operation at the loading station and at the billing machine.

In Fig. 5 is shown in longitudinal section one embodiment of the electromagnetic grip 107 which is constructed to cooperate with shaft 12 of the auto-stop register 2 to prevent rotation of this shaft and change in the setting of the auto-stop register after the element 150 identified with the selected loading station in a selected billing machine is actuated.

The shaft 12 passes through bearings formed in the bosses 504 and 503 provided respectively in the end closing plate 505 and in the end wall 506 of the casing 507 of the device. In this embodiment the casing 507 is of cylindrical form with the end wall 506 integral therewith. To this casing the end closing plate 505 is fastened by screws 509 entering the periphery of this plate through the cylinder wall of casing 507. Within the inner bore of the casing 507 is a spool 511 fastened to the casing by screws 512. This spool carries the coil 513 of a solenoid the terminals 515 of which pass out through the wall of the casing 507 through insulating bushings 516. The terminals 515 are connected respectively to ground and to the contact 168 as shown in Figs. 1 and 4.

In holes drilled in bosses 517 formed on the end plate 505 a plurality of pins 518 are rigidly fastened and extend generally parallel to the axis of the shaft 12. Preferably, these pins are formed of non-magnetic material. Co-axially with the shaft 12 an armature 519 of annular cylindrical form is supported on the pins 518, this armature being provided with holes extending therein parallel to the axis of the armature which fit slidably on the pins 518 to provide for movement of the armature in the direction parallel to the axis of the shaft 12. At the right hand end of the armature in Fig. 5 the armature is provided with teeth 521 adapted to cooperate as a clutch with the teeth 523 of a cooperating clutch member 525 fitted upon the shaft 12 and keyed thereto by the key 526. The clutch member 525 may be of cylindrical form and cup shaped to receive a compression spring 527 which bears against the end wall of the cup and against the end of the armature 519 to bias this armature toward the left in Fig. 5 to the position shown where the teeth 521 and 523 are disengaged.

It will be noted that the armature 519 is of such length and is so positioned relative to the central plane of the solenoid coil 513 that upon energization of this coil effected by closing of the contact 168 the armature 519 will be drawn toward the right substantially to a position symmetrical with respect to the central plane of the solenoid coil 513. In such movement toward the right the teeth 521 and 523 of the clutch members will be engaged with each other. Since the casing 507 of the electro-magnetic grip 107 is fixed against rotation, it will be apparent that upon energization of the solenoid 513 the shaft 12 will be held against rotation if operation thereof by the handle 103 fastened thereto is attempted. Thus, when a selector element 150 of a given billing machine with which the auto-stop 2 is associated is pressed to select the loading station and meter to be connected to the given billing machine and its registers, the auto-stop having been previously set to the amount to be dispensed, thereafter and until the auto-stop has returned to zero thereby releasing the actuated element 150 the setting of the auto-stop may not be changed by the operation of the handle 103. The device shown in Fig. 5 may be variously designed to cooperate with the auto-stop register and the means actuated by elements 150 to produce the result of preventing change in the setting of the auto-stop register during the operation thereof in a dispensing operation of the apparatus.

It will be understood that various changes in the details of the elements of the system and in their association in the complete apparatus may be made without departing from the invention which is not to be deemed as limited except as indicated by the scope of the appended claims.

I claim:

1. Dispensing apparatus comprising a plurality of registers, a measuring device, an electric circuit for connecting said registers to said measuring device, electrically energizable means in said circuit for controlling passage of material through said measuring device, an element for each register selectively actuatable to a position to close contacts in said circuit to connect the register with which said element is associated to said measuring device and to energize said electrically energizable means to control said passage of material through said measuring device, and means operatively connected to said elements and effective when the element associated with a selected register is in said actuated position to engage the elements associated with the other registers to prevent actuation of said other elements which otherwise are actuatable to energize said electrically energizable means to operate said measuring device.

2. Dispensing apparatus as defined in claim 1 in which said means for preventing actuation of said other elements comprises electrically energizable stop means associated with each element and effective upon such energization thereof to intercept movement of said other elements from their unactuated positions to their actuated positions, and a stop means control contact associated with each element and actuated thereby upon actuation of such element to connect a selected register to said measuring device, said electrically energizable stop means and said stop means control contacts associated with the several elements which respectively are actuatable to connect said registers to said measuring device being connected in a circuit so as to effect operation of said stop means associated with all of the other elements upon operation of a stop means control contact associated with any of said elements.

3. Dispensing apparatus comprising a plurality of registers, a measuring device, an electric circuit for connecting said registers to said measuring device, electrically energizable means in said circuit for controlling passage of material through said measuring device, an auto-stop associated with each register and having a contact in said circuit closable upon setting of said auto-stop in a position of setting other than an initial position and open when said auto-stop is in said initial position, an element associated with each register and actuatable to close a contact in said circuit connected in series with said auto-stop actuated contact of said register to energize said electrically energizable means for effecting passage of material through said measuring device upon setting of said auto-stop to said position other than said initial position, a solenoid associated with each element, means actuated by said solenoid and effective when said solenoid is energized to engage said element with which said solenoid is associated to prevent actuation of said element, and an auxiliary contact associated with each element and connected in a circuit with said solenoids and actuated upon actuation of said associated element and effective upon such actuation to energize said solenoids so as to prevent actuation of the other elements.

CHARLES S. HAZARD.

REFERENCES CITED

The following references are of record in the file of this patent:

UNITED STATES PATENTS

| Number | Name | Date |
|---|---|---|
| 2,060,674 | Hicks | Nov. 10, 1936 |
| 2,068,719 | Troutman | Jan. 26, 1937 |
| 2,116,785 | Griffith | May 10, 1938 |
| 2,193,474 | Brayer | Mar. 21, 1940 |
| 2,250,326 | Carroll | July 22, 1941 |
| 2,379,785 | Bugg | July 3, 1945 |
| 2,538,243 | Hazard | Jan. 16, 1951 |